US007310118B2

(12) United States Patent
Kamimura

(10) Patent No.: US 7,310,118 B2
(45) Date of Patent: Dec. 18, 2007

(54) IMAGE DISPLAY APPARATUS

(75) Inventor: Kazuhiro Kamimura, Tokyo-to (JP)

(73) Assignee: Victor Company of Japan, Limited, Yokohama, Kanagawa-ken (JP)

( * ) Notice: Subject to any disclaimer, the term of this patent is extended or adjusted under 35 U.S.C. 154(b) by 522 days.

(21) Appl. No.: 11/062,701

(22) Filed: Feb. 23, 2005

(65) Prior Publication Data

US 2005/0184949 A1 Aug. 25, 2005

(30) Foreign Application Priority Data

Feb. 25, 2004 (JP) ........................... P2004-049227

(51) Int. Cl.
*H04N 7/01* (2006.01)

(52) U.S. Cl. ....................................... 348/441; 348/459

(58) Field of Classification Search ................ 348/441, 348/443, 458, 459, 739, 790, 448–452, 795; *H04N 11/20, H04N 7/01*
See application file for complete search history.

(56) References Cited

U.S. PATENT DOCUMENTS 7,202,908 B2 * 4/2007 Zhou et al. ................. 348/452

OTHER PUBLICATIONS

Kurita, T. "Fundamental Deterioration of Picture Quality for Moving Images Displayed on LCDs and Methods for Improvement", Technical Report of IEICE EID2000-47 (Sep. 2000), pp. 13-18.

* cited by examiner

*Primary Examiner*—Sherrie Hsia
(74) *Attorney, Agent, or Firm*—The Nath Law Group; Jerald L. Meyer; Stanley N. Protigal

(57) ABSTRACT

An image display apparatus has a hold-type display panel composed of a matrix of pixels each holding an electric signal for a predetermined period. In the image display apparatus, an intermediate value detector provides an intermediate value signal from adjacent two frames of a video signal having a first frame frequency (60 Hz), a multiplier multiplies the intermediate value signal by a coefficient that is smaller than 1, and an interpolator inserts the coefficient-multiplied intermediate value signal into the adjacent two frames of the video signal to provide a video signal having a second frame frequency (120 Hz). According to the video signal of the second frame frequency, an image is displayed on the hold-type display panel.

1 Claim, 3 Drawing Sheets

IMAGE DISPLAY APPARATUS

BACKGROUND OF THE INVENTION

1. Field of the Invention

The present invention relates to hold-type image display apparatuses such as liquid crystal displays and organic electroluminescence displays, and particularly, to a hold-type image display apparatus capable of presenting blur-reduced motion images.

2. Description of Related Art

Image display apparatuses are classified into impulse-type display apparatuses such as those employing cathode ray tubes (CRTs) that momentarily emit strong beams to display images and hold-type display apparatuses such as active-matrix display apparatuses that employ pixels with a memory function to hold an image for every frame period. An example of the active-matrix display apparatus is a liquid crystal display (LCD) employing thin-film transistors (TFTs). The LCD has pixels each including a TFT and a capacitor to hold a written image signal for a given period.

The hold-type display apparatus has a draw back of causing a blur when displaying motion images (hereinafter referred to as the motion image blur). It has been understood that the motion image blur is caused due to a slow response speed of liquid crystal. The motion image blur, however, never solves by increasing the liquid-crystal response speed because the blur is intrinsic to the hold-type display. The blur problem and a solution for it are described in Taiichiro Kurita, "Theory of Motion Image Deterioration in LCD and Method of Solving the Same," IEICE Technical Report, EID2000-47 (2000-09), pp. 13-18. The motion image blur occurs not only on the LCD but also on the organic electroluminescence display of active-matrix type. The method of solving the motion image blur described in the above-mentioned document shortens a hold time like the impulse-type display apparatus.

The method described in the above-mentioned document needs a device to shut a backlight in synchronization with a video signal. The technique has a drawback of spoiling a feature of the hold-type display apparatus of providing flicker-free images. The technique has another problem of decreasing the brightness of a screen because the technique shortens the emission time of each pixel.

SUMMARY OF THE INVENTION

The present invention has been made in consideration of these problems of the related art. An object of the present invention is to provide an image display apparatus capable of fully using the flicker-free feature of the hold-type display apparatus, preventing a brightness decrease, and reducing the motion image blur.

In order to accomplish the object, an aspect of the present invention provides an image display apparatus having an active-matrix display panel (3) composed of a matrix of pixels each holding an electric signal for a predetermined period to display an image.

The image display apparatus includes a frame-rate converter (1) to convert a first video signal having a first frame frequency into a second video signal having a second frame frequency that is higher than the first frame frequency and a driver (2) to display an image on the active-matrix display panel according to the second video signal.

The frame-rate converter has an interpolation frame generator (12) to generate an interpolation frame signal from frames of the first video signal, a multiplier (13) to multiply the interpolation frame signal by a coefficient that is larger than 0 and smaller than 1, and an interpolator (15) to interpolate the coefficient-multiplied interpolation frame signal into the first video signal and provide the second video signal.

The image display apparatus according to this aspect of the present invention can fully utilize the flicker-free feature of the hold-type display apparatus, prevent a brightness decrease, and reduce the motion image blur. This apparatus needs no special circuit such as a shutter to turn off a backlight, and therefore, can be materialized at low cost.

The nature, principle and utility of the invention will become more apparent from the following detailed description when read in conjunction with the accompanying drawings.

DETAILED DESCRIPTION OF EMBODIMENTS

An image display apparatus according to an embodiment of the present invention will be explained with reference to the drawings.

Figure 1:
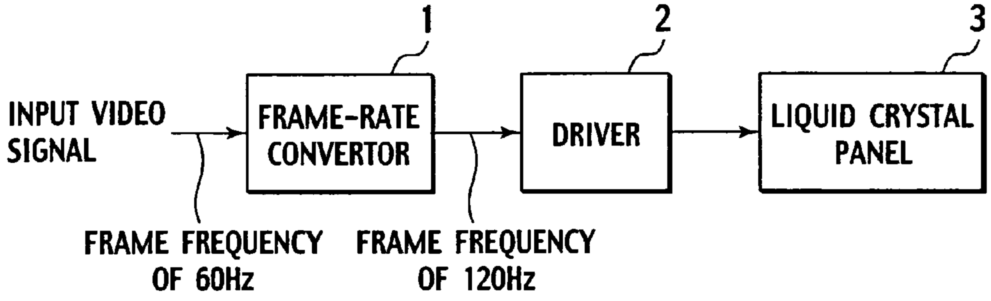
FIG. 1 is a block diagram showing an image display apparatus according to an embodiment of the present invention.

FIG. 1 is a block diagram showing the image display apparatus according to an embodiment of the present invention.

In FIG. 1, the image display apparatus includes a frame-rate converter 1 that receives an input video signal which is a sequential scan signal having a frame frequency of 60 Hz. The frame-rate converter 1 doubles the frame frequency of the input video signal to 120 Hz. The image display apparatus according to the embodiment is characterized by frame-rate conversion conducted by the frame-rate converter 1. The details of this will be explained later. The video signal of 120-Hz frame rate is supplied to a driver 2. Based on this video signal, the driver 2 drives a liquid crystal panel 3 to display an image at the frame rate of 120 Hz. The liquid crystal panel 3 is a hold-type display panel. The display panel is not limited to a liquid crystal display panel. It may be any active-matrix display panel composed of a matrix of pixels each holding an electric signal for a predetermined period to display an image.

Figure 2:
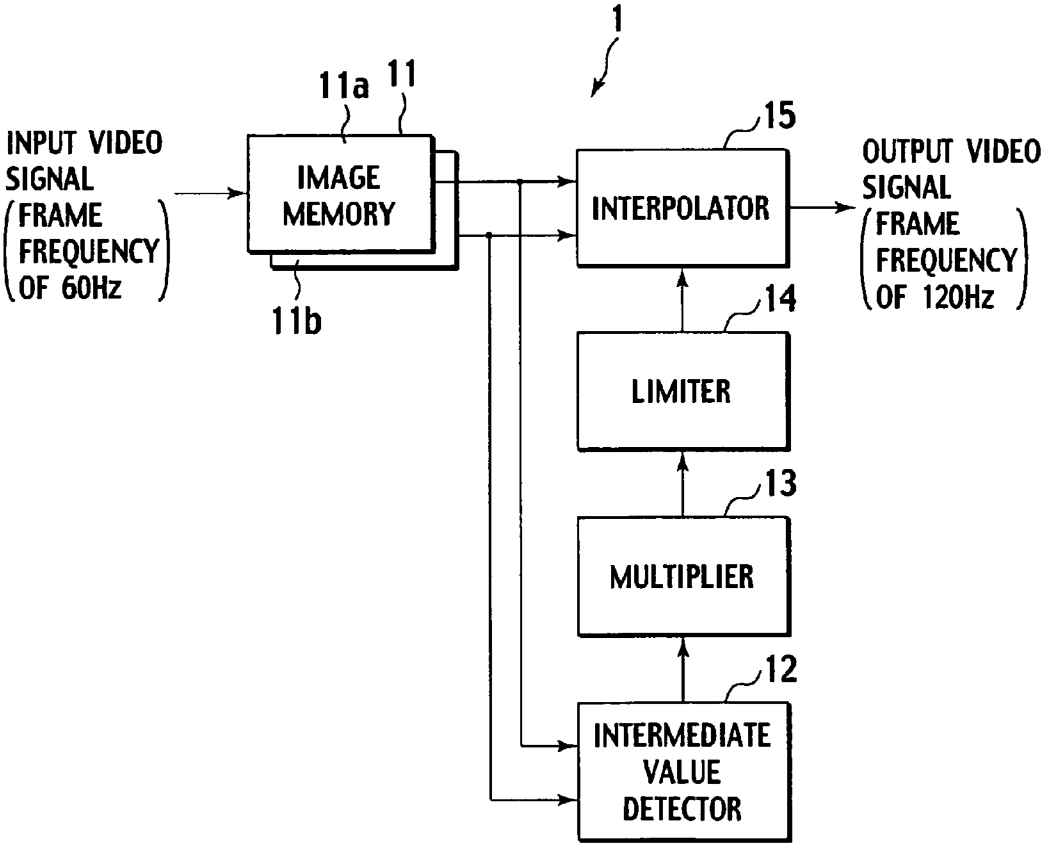
FIG. 2 is a block diagram showing the details of a frame-rate converter of the apparatus of FIG. 1.

FIG. 2 is a block diagram showing an example structure of the frame-rate converter 1.

In FIG. 2, an image memory 11 receives the video signal of 60-Hz frame rate. The image memory 11 has a capacity to store image data of at least two frames. In this example, the image memory 11 consists of memory parts 11*a* and 11*b* each capable of storing one frame of image data. Namely, a frame of image data is written into each of the memory parts 11*a* and 11*b* at a write frequency of 60 Hz, and the memory parts 11*a* and 11*b* are simultaneously read at a read frequency of 120 Hz. The image data read out of the image memory 11 is supplied to an intermediate value detector 12 and an interpolator 15.

The intermediate value detector 12 detects an intermediate value (a central value in this example) between every corresponding pixel values of the two frames. For example, a first pixel position of the frame read out of the memory part 11*a* has a pixel value of 200, and a second pixel position that corresponds to the first pixel position and is read out of the memory part 11*b* has a pixel value of 100. Then, an intermediate value between the pixel values of the first and second pixel positions is 150.

The intermediate value detector 12 provides an intermediate value signal representative of the detected intermediate values to a multiplier 13. The multiplier 13 multiplies the intermediate value signal by a coefficient of, for example, ½. The coefficient value of ½ is only an example of a preferable coefficient value. It may be any value greater than 0 and smaller than 1. The output of the multiplier 13 is controlled by a limiter 14. The output of the limiter 14 is supplied to the interpolator 15. The interpolator 15 inserts the data from the limiter 14 into the two frames of image data from the image memory 11 and provides a video signal having the frame frequency of 120 Hz.

Figure 3A:
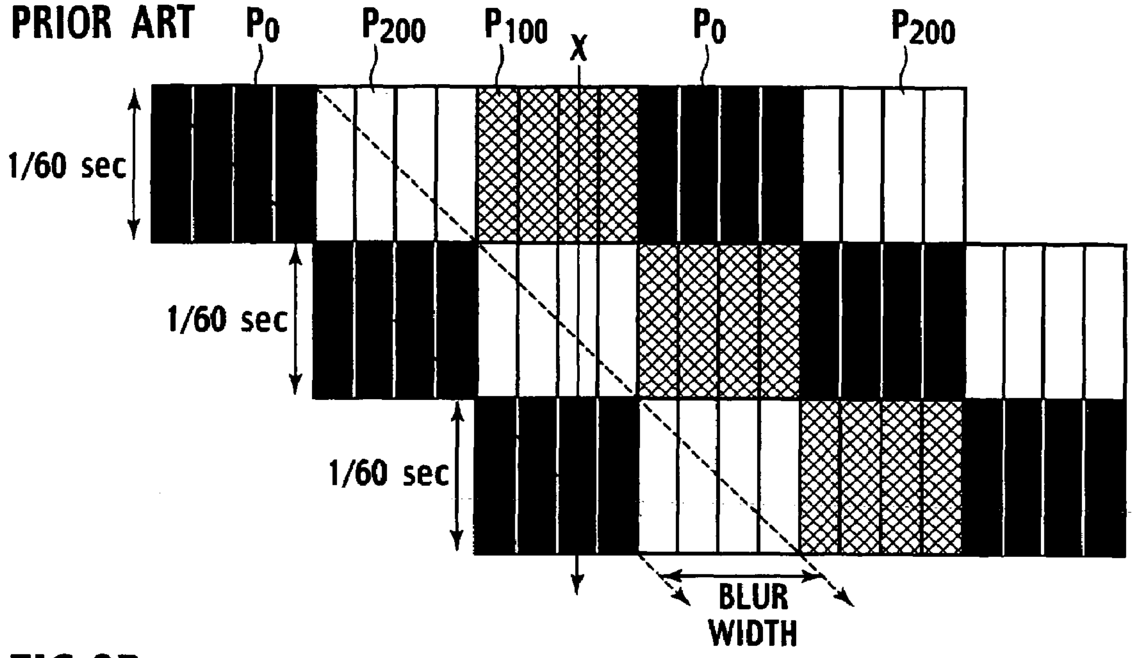
FIG.3A PRIOR ART
FIGS. 3A to 3C explain operation of the frame-rate converter according to the present invention and of the related art.
Figure 3B:
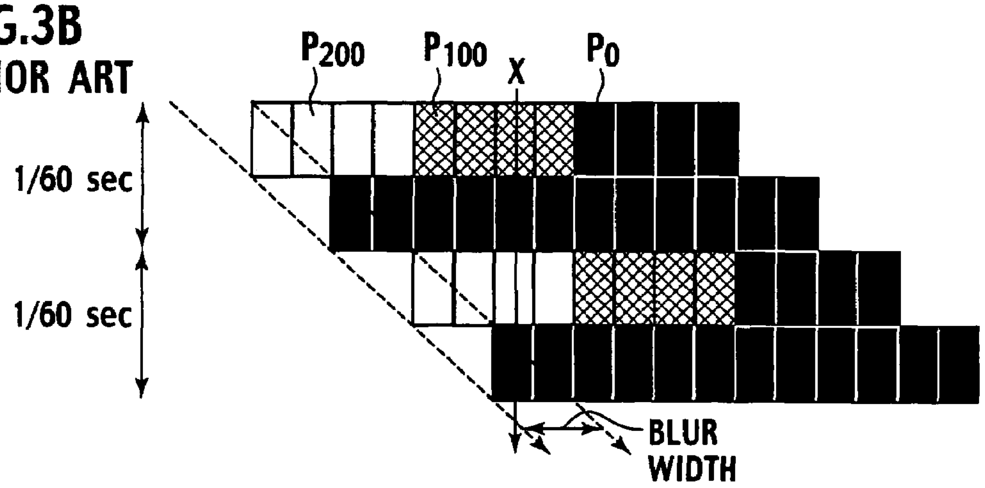
FIG.3B PRIOR ART
Figure 3C:
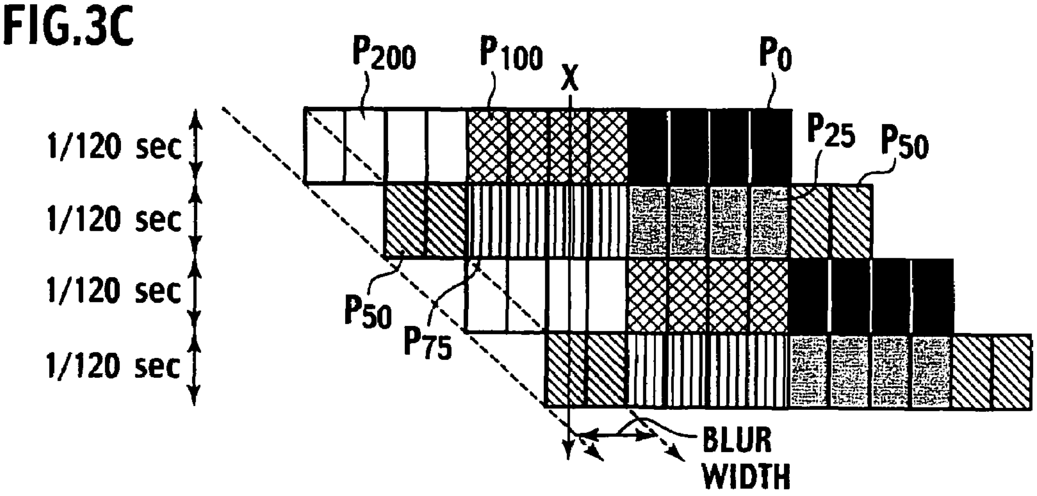
Figure 4A:
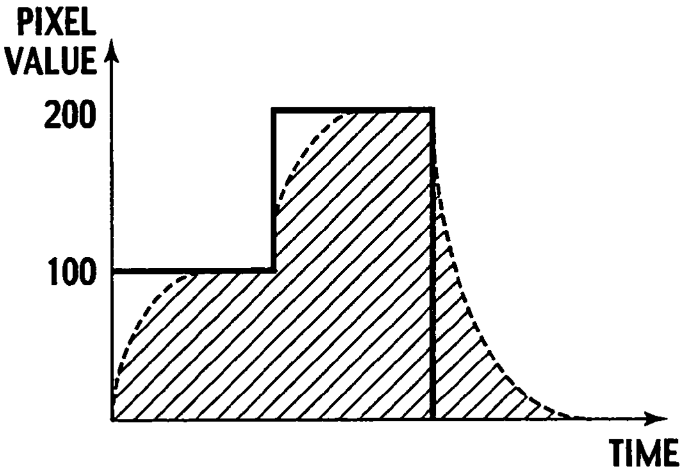
FIG.4A PRIOR ART
FIGS. 4A to 4C explain effect of the present invention and of the related art.
Figure 4B:
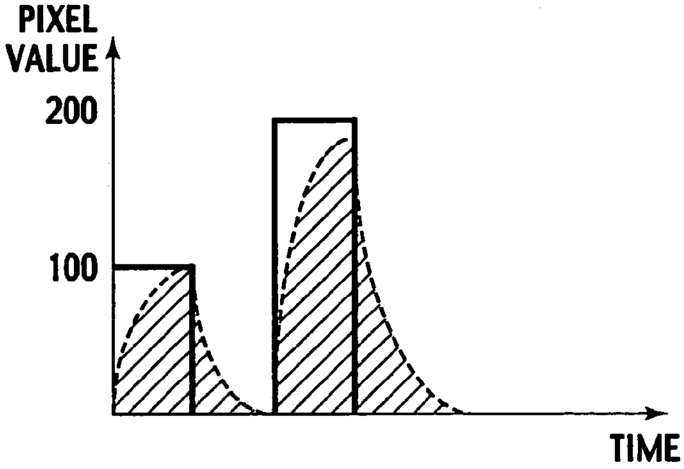
FIG.4B PRIOR ART
Figure 4C:
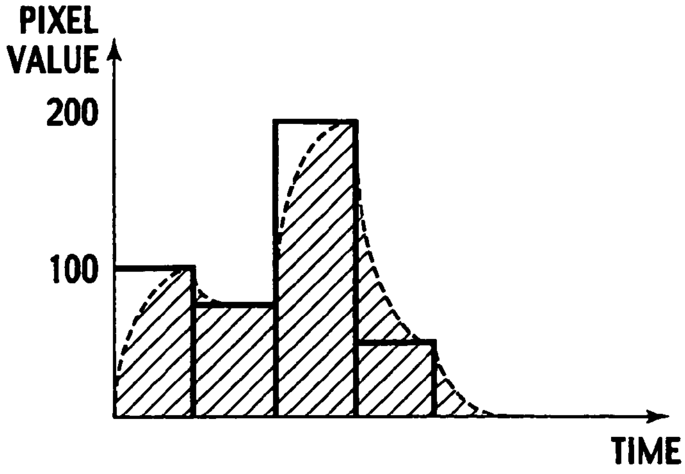

FIG. 3A to 3C explain operation of the frame-rate converter 1 of FIG. 2 and that of the related art and FIGS. 4A to 4C explain effect of the present invention and that of the related art.

The operation and effect of the frame-rate converter 1 of FIG. 2 will be explained in detail with reference to FIGS. 3A to 3C and 4A to 4C.

The video signal of 60-Hz frame frequency supplied to the image memory 11 involves, for example, a step waveform shown in FIG. 3A to display, among other pixels, pixels $P_{200}$ each having a pixel value of 200, pixels $P_{100}$ each having a pixel value of 100, and pixels $P_0$ each having a pixel value of 0. The step waveform horizontally moves from the left to the right. At this time, the motion image blur occurs with a width shown in FIG. 3A. Pixel values at a pixel position X in FIG. 3A change as shown in a graph of FIG. 4A in which an abscissa represents time and an ordinate the pixel value. A hatched area in the graph of FIG. 4A indicates visibility at the pixel position X depending on a response of the pixel.

FIG. 3B shows the related art that shortens a hold time by shutting a backlight. The backlight is shut for a half of 1/60 second, to halve the hold time. The period during which the backlight is shut is equal to a period in which a pixel value of 0 is applied to each pixel. This technique makes the width of the motion image blur narrower than that of FIG. 3A, to thereby reduce the motion image blur.

Pixel values at the pixel position X in FIG. 3B change as shown in a graph of FIG. 4B. This graph is closer to a graph to be plotted by the impulse-type display apparatus. However, the graph involves a large pixel value difference between adjacent frames, to cause flickering. In addition, this technique decreases the brightness of a screen as is apparent from a reduced hatched area shown in the graph of FIG. 4B.

FIG. 3C shows a display state according to the embodiment of the present invention. As explained above, the embodiment employs the intermediate value detector 12 that provides an intermediate value signal and the multiplier 13 that multiplies the intermediate value signal by the coefficient of ½ and provides a video signal to be inserted. In FIG. 3C, there is a section where the pixels $P_{100}$ each having the pixel value of 100 change to the pixels $P_{200}$ each having the pixel value of 200. To each pixel in this section, a pixel value of 75 is applied as indicated with $P_{75}$. In FIG. 3C, there is a section where the pixels $P_0$ each having the pixel value of 0 change to the pixels $P_{100}$ each having the pixel value of 100. To each pixel in this section, a pixel value of 25 is applied as indicated with $P_{25}$. This technique makes the width of the motion image blur narrower than that of FIG. 3A, to thereby reduce the motion image blur.

Pixel values at the pixel position X in FIG. 3C change as shown in a graph of FIG. 4C. This graph of the embodiment of the present invention approximates a graph to be plotted by the impulse-type display apparatus. In addition, the graph involves a small pixel value difference between adjacent frames, to suppress flickering. As is apparent from a hatched area in the graph of FIG. 4C, the embodiment can suppress a screen brightness decrease.

According to the embodiment explained above, the intermediate value detector 12 in the frame-rate converter 1 provides an intermediate value signal, which is used to generate an interpolation frame signal. This technique of generating an interpolation frame signal, however, does not limit the present invention. The present invention may employ, for example, a motion vector detector employing a matching method to generate an interpolation frame signal. Also, the present invention is not limited to generating an interpolation frame signal according to adjacent two frames. For example, the present invention can generate an interpolation frame signal from any number of frames such as four frames. Instead of directly inserting an interpolation frame signal, the present invention multiplies the interpolation frame signal by a predetermined coefficient to reduce the level of each pixel value and then inserts the coefficient-multiplied interpolation frame signal into a video signal to display. This is an important characteristic of the present invention. Without departing from the spirit of the present invention, many amendments or modifications will be possible.

What is claimed is:

1. An image display apparatus having an active-matrix display panel composed of a matrix of pixels each holding an electric signal for a predetermined period to display an image, comprising:

a frame-rate converter configured to convert a first video signal having a first frame frequency into a second video signal having a second frame frequency that is higher than the first frame frequency; and a driver configured to display an image on the active-matrix display panel according to the second video signal, the frame-rate converter including:

an interpolation frame generator configured to generate an interpolation frame signal from frames of the first video signal;

a multiplier configured to multiply the interpolation frame signal by a coefficient that is larger than 0 and smaller than 1; and an interpolator configured to interpolate the coefficient-multiplied interpolation frame signal into the first video signal and provide the second video signal.

* * * * *